June 19, 1923.  A. R. ANDERSEN  1,459,134
MOUNTING FOR MINE CAR WHEELS
Filed March 14, 1923
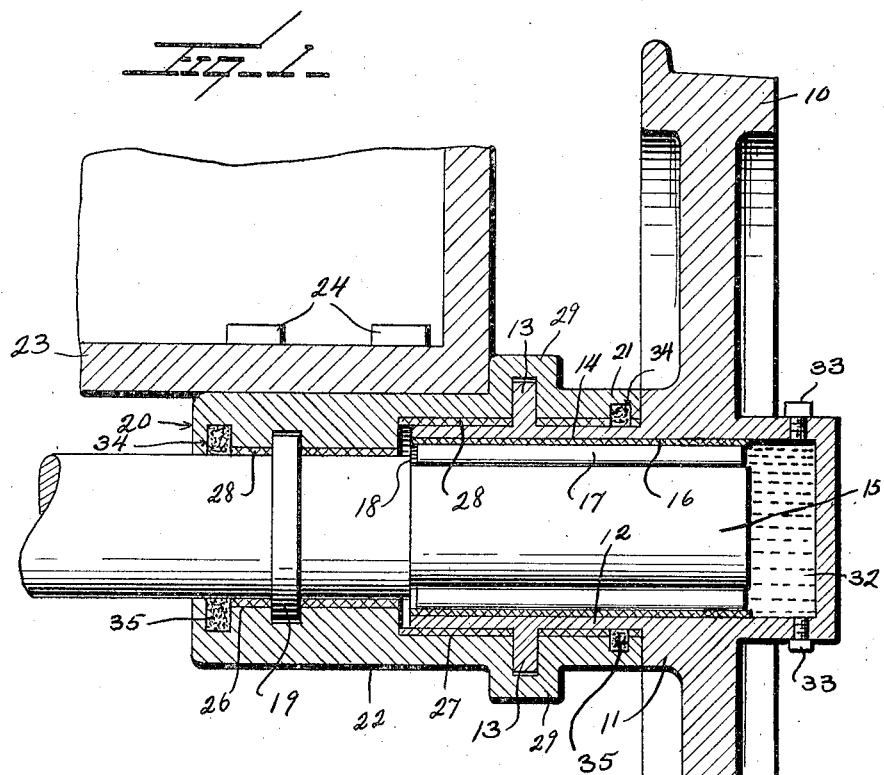
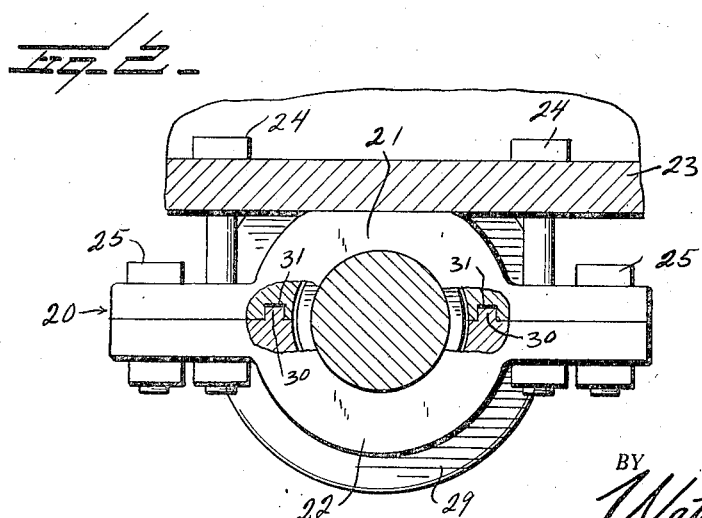
INVENTOR.
A. R. Andersen
BY Watson E. Coleman
ATTORNEY.

Patented June 19, 1923.

1,459,134

UNITED STATES PATENT OFFICE.

ALFRED R. ANDERSEN, OF ROCK SPRINGS, WYOMING, ASSIGNOR OF ONE-HALF TO JOE F. DOMINISKI, OF ROCK SPRINGS, WYOMING.

MOUNTING FOR MINE-CAR WHEELS.

Application filed March 14, 1923. Serial No. 625,114.

*To all whom it may concern:*

Be it known that I, ALFRED R. ANDERSEN, a citizen of the United States, residing at Rock Springs, in the county of Sweetwater and State of Wyoming, have invented certain new and useful Improvements in Mountings for Mine-Car Wheels, of which the following is a specification, reference being had to the accompanying drawings.

This invention relates to improvements in mine car wheels and more particularly to a mounting therefor.

An important object of the invention is to provide a mounting for mine car wheels whereby the bearing of the axle not only supports the axle but likewise the supporting wheel.

A further object of the invention is to provide a construction of this character wherein a cooperation of the bearing with the driving wheel not only provides a supporting mounting therefor, but prevents movement of the wheel upon the axle and accordingly the accidental loss of the wheel while the car is in transit.

A still further object of the invention is to provide a mounting of this character whereby the frictional engagement of the axle with the wheel is materially reduced.

A further object is to provide an improved lubricating system for wheels of this character.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is an enlarged vertical sectional view taken through a wheel and mounting therefor constructed in accordance with my invention; and Figure 2 is a rear elevation partially in section.

Referring now more particularly to the drawings, the numeral 10 designates a car wheel of any desired construction insofar as those portions exteriorly of the hub 11 thereof are concerned. The hub 11 is constructed with an extension 12 at one side which is exteriorly finished for engagement with a bearing surface, this extension being provided intermediate its ends with an outstanding flange 13. The extension has formed therein a bore 14 for the reception of the axle 15, which bore terminates short of the outer face of the wheel, thus providing a closed end for the bore.

The bore 14 of the extension is provided on its inner surface with a finished bearing face 16 which may be in the form of a bushing which is removable, or an ordinary finished surface which is provided for this purpose. With this bearing surface the outer end of the axle 15 engages either directly or through a roller bearing 17 as desired. Where a bearing 17 is employed the outer end of the axle 15 is preferably reduced as indicated at 18. Beyond the inner end of the extension 12 and in spaced relation thereto the axle 15 has formed thereon an annular flange 19 similar to the flange 13 of the extension 12.

The numeral 20 indicates a bearing formed in two sections 21 and 22, the upper section 21 being secured to a suitable support 23 in the present instance intended as the body of a mine car by means of bolts 24 or the like. The sections 21 and 22 of the bearing 20 are held in assembled relation by any suitable means such as clamping screws 25 and when so assembled provide a structure having a bore 26 in which the axle 15 is rotatable and a bore 27 in which the extension 12 is rotatable, each of these bores being provided with a bearing 28 of any suitable character. Each bore 26 and 27 is enlarged as indicated at 29 to provide a channel for rotatably receiving the flange of its associated part as the flange 13 of the extension 12 or the flange 19 of the axle 15. The lower section 22 of the bearing has formed thereon in spaced relation to the bores 26 and 27 thereof, upstanding ribs 30 extending into corresponding grooves 31 formed in the upper section 21 and which may, if so desired, be provided with packing so that the flange 30 in engaging in the groove will form a tight seal between the sections 20 and 21 preventing the leakage of oil from the bearing. The inner end of the bore 26 adjacent its inner end and the bore 27 adjacent its outer end are enlarged to provide channels 34 for the reception of felt washers 35, having engagement with the axle 15 and hub 12 respectively and operating in the usual manner to prevent the oil leakage.

The wheel 10 has formed thereon, preferably by an integral casting carried by the hub 11, an oil reservoir 32 provided with suitable filling or draining openings 33 and communicating directly with the bore 14 of the extension 12. When the device is in assembled relation the outer end of the axle 15 and the bearings 17 are positioned to be acted on directly by the oil in the reservoir and actually form one wall of the reservoir. It will be obvious that oil from the reservoir, passing into the bore 14, will lubricate the adjacent end of the axle 15 and subsequently find its way to the bearing surface of the bores 26 and 27 to lubricate the same. The channels or enlargements of the bores 26 and 27 are preferably of greater depth than the flange which they receive so that the space is provided about the periphery of the flanges for the storage of oil whereby these flanges will pick up the oil and deliver it to the bearing surfaces during operation of the car.

It will be noted that with the construction employed, the longitudinal movement of the wheel 10 and the axle 15 are prevented and that the axle 15 and wheel 10 supported thereby are independently rotatable. This is an important feature of the construction, since if none of the wheels of a car become jammed due to light bearings or collected dirt the axle is simply picked up and rotated by and with the wheel and the car is not disabled. Furthermore the fixed rotation of the wheel and axle are given indication that attention for the wheel is necessary. It will furthermore be obvious that the structural details hereinbefore set forth are capable of some change and modification without materially departing from the spirit of my invention and I accordingly do not limit myself to such specific structure except as hereinafter claimed.

What is claimed is:—

1. In a mounting for mine car wheels and in combination, an extension formed upon the inner face of a hub of the wheel and having a bore receiving the axle, a bearing rotatably receiving the axle and the extension, and an engagement between the axle and the bearing preventing longitudinal movement of the axle in the bearing in either direction.

2. In a mounting for mine car wheels and in combination, an extension formed upon the inner face of a hub of the wheel and having a bore receiving the axle, a bearing rotatably receiving the axle and the extension, and an engagement between the axle and the bearing and the extension and the bearing preventing longitudinal movement of the axle and the extension with respect to the bearing in either direction.

3. In a mounting for mine car wheels and in combination, an extension formed upon the inner face of a hub of the wheel and having a bore receiving the axle, a bearing rotatably receiving the axle and the extension, and an engagement between the axle and the bearing and the extension and the bearing preventing longitudinal movement in either direction of the axle and the extension with respect to the bearing, and to one another.

In testimony whereof I hereunto affix my signature.

ALFRED R. ANDERSEN.